United States Patent
Lei et al.

(10) Patent No.: US 11,037,382 B2
(45) Date of Patent: Jun. 15, 2021

(54) SYSTEM AND METHOD FOR EVALUATING OPERATION OF ENVIRONMENTAL SENSING SYSTEMS OF VEHICLES

(71) Applicant: Ford Global Technologies, LLC, Dearborn, MI (US)

(72) Inventors: Oliver Lei, Windsor (CA); Allen R. Murray, Lake Orion, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 16/197,117

(22) Filed: Nov. 20, 2018

(65) Prior Publication Data
US 2020/0160626 A1    May 21, 2020

(51) Int. Cl.
*G07C 5/08* (2006.01)
*B60W 50/02* (2012.01)
(Continued)

(52) U.S. Cl.
CPC ....... *G07C 5/0808* (2013.01); *B60W 50/0205* (2013.01); *G05D 1/0088* (2013.01);
(Continued)

(58) Field of Classification Search
CPC . G07C 5/0808; G07C 5/008; B60W 50/0205; B60W 2050/0215; G08G 1/0112;
(Continued)

(56) References Cited

U.S. PATENT DOCUMENTS 6,129,025 A * 10/2000 Minakami ............... B60L 13/03
                                                    104/88.01
7,027,808 B2 * 4/2006 Wesby ................ H04L 41/0816
                                                    455/419
(Continued)

FOREIGN PATENT DOCUMENTS

CN    203876655 U  * 10/2014  ............. G05D 1/106
CN    105122020 A  * 12/2015  ........... G01G 19/024
(Continued)

OTHER PUBLICATIONS

Carlson, et al., Advancing Innovative High-Speed Remote-Sensing Highway Infrastructure Assessment Using Emerging Technologies: Technical Report, Texas A&M Transportation Institute, Feb. 2017 (384 pages).
(Continued)

*Primary Examiner* — Behrang Badii
*Assistant Examiner* — Jalal C Coduroglu
(74) *Attorney, Agent, or Firm* — Brandon Hicks; Eversheds Sutherland (US) LLP

(57) ABSTRACT

A computer system is in wireless communication with a plurality of vehicles, each of the vehicles equipped with appropriate environmental sensors. Environmental reports are sent from the autonomous vehicles to the computer system using a V2X protocol or the like, and relate to such matters as worn line markings, obstacles on the roadway, and other conditions. The computer system is configured to evaluate the received environmental reports for accuracy. A comparison with similar environmental reports is made, and if there are few or no such reports for the location, an indication is reported to the vehicle that the vehicle's sensors may have a problem. The evaluation can be presented with a degree of confidence, taking into consideration various (Continued)

factors such as frequency of vehicles traversing the location, weather, time of day, etc.

20 Claims, 5 Drawing Sheets

(51) Int. Cl.
| | |
|---|---|
| G07C 5/00 | (2006.01) |
| G08G 1/01 | (2006.01) |
| G06K 9/00 | (2006.01) |
| G05D 1/00 | (2006.01) |
| H04W 4/40 | (2018.01) |

(52) U.S. Cl.
CPC ..... *G06K 9/00798* (2013.01); *G06K 9/00805* (2013.01); *G07C 5/008* (2013.01); *G08G 1/0112* (2013.01); *H04W 4/40* (2018.02); *B60W 2050/0215* (2013.01); *G05D 2201/0213* (2013.01)

(58) Field of Classification Search
CPC ........... G06K 9/00805; G06K 9/00798; G05D 1/0088; G05D 2201/0213; H04W 4/40; H04W 4/023; H04W 4/38; G01D 21/02
See application file for complete search history.

(56) References Cited

U.S. PATENT DOCUMENTS

| | | | | |
|---|---|---|---|---|
| 7,038,190 B2* | 5/2006 | Udd | ............... | G01D 5/35383 |
| | | | | 250/227.11 |
| 7,366,602 B2* | 4/2008 | Xu | ............... | B60W 10/22 |
| | | | | 701/70 |
| 7,416,263 B2* | 8/2008 | Schmitt | ............... | B60T 8/17555 |
| | | | | 303/11 |
| 7,834,754 B2* | 11/2010 | Kulesz | ............... | H04L 67/12 |
| | | | | 340/506 |
| 8,577,550 B2* | 11/2013 | Lu | ............... | B60W 10/20 |
| | | | | 701/41 |
| 8,770,140 B2* | 7/2014 | Nielsen | ............... | B05B 12/08 |
| | | | | 118/663 |
| 9,197,452 B2* | 11/2015 | Menzel | ............... | H04L 25/0202 |
| 9,494,935 B2* | 11/2016 | Okumura | ............... | B60W 30/00 |
| 9,623,905 B2* | 4/2017 | Shashua | ............... | G01C 21/3691 |
| 9,840,253 B1* | 12/2017 | Prasad | ............... | G05D 1/0246 |
| 9,880,911 B2* | 1/2018 | Poledna | ............... | G05B 19/0428 |
| 9,950,665 B2* | 4/2018 | Hauler | ............... | B60Q 7/005 |
| 10,026,309 B1* | 7/2018 | Nepomuceno | ............... | G08G 1/166 |
| 10,507,841 B1* | 12/2019 | Singh | ............... | B60W 50/029 |
| 10,521,974 B2* | 12/2019 | Du | ............... | B60W 50/0205 |
| 10,831,207 B1* | 11/2020 | Leung | ............... | B60W 50/045 |
| 2009/0233622 A1* | 9/2009 | Johnson | ............... | H04W 4/24 |
| | | | | 455/456.3 |
| 2009/0233623 A1* | 9/2009 | Johnson | ............... | H04W 4/023 |
| | | | | 455/456.3 |
| 2010/0069035 A1* | 3/2010 | Johnson | ............... | H04L 41/0816 |
| | | | | 455/404.1 |
| 2011/0082623 A1* | 4/2011 | Lu | ............... | B60W 30/09 |
| | | | | 701/41 |
| 2012/0173185 A1* | 7/2012 | Taylor | ............... | G01S 7/4004 |
| | | | | 702/104 |
| 2014/0368373 A1* | 12/2014 | Crain | ............... | G01S 13/90 |
| | | | | 342/5 |
| 2014/0368378 A1* | 12/2014 | Crain | ............... | G01S 13/867 |
| | | | | 342/25 A |
| 2015/0025788 A1* | 1/2015 | Crain | ............... | G01S 7/02 |
| | | | | 701/400 |
| 2015/0355089 A1* | 12/2015 | Takase | ............... | G01N 29/223 |
| | | | | 422/82.11 |
| 2015/0360865 A1* | 12/2015 | Massey | ............... | B25J 9/0003 |
| | | | | 414/275 |
| 2016/0047903 A1* | 2/2016 | Dussan | ............... | G01S 7/4814 |
| | | | | 356/5.01 |
| 2017/0067764 A1* | 3/2017 | Skupin | ............... | G07C 5/008 |
| 2017/0105086 A1* | 4/2017 | Wesby | ............... | H04W 4/00 |
| 2017/0158193 A1* | 6/2017 | Lopez | ............... | G08G 1/166 |
| 2017/0162056 A1* | 6/2017 | Feyerabend | ............... | B60W 50/14 |
| 2017/0168483 A1* | 6/2017 | Knorr | ............... | B60W 60/0053 |
| 2017/0168484 A1* | 6/2017 | Knorr | ............... | G05D 1/0061 |
| 2017/0365105 A1* | 12/2017 | Rao | ............... | G07C 5/006 |
| 2018/0033223 A1* | 2/2018 | Gortsas | ............... | G01J 1/0228 |
| 2018/0053422 A1* | 2/2018 | Altinger | ............... | G08G 1/143 |
| 2018/0186366 A1* | 7/2018 | Gordon | ............... | B60W 30/09 |
| 2018/0196135 A1* | 7/2018 | Crain | ............... | G01S 7/026 |
| 2018/0283895 A1* | 10/2018 | Aikin | ............... | G08G 1/0104 |
| 2019/0066410 A1* | 2/2019 | Buchholz | ............... | G08G 1/0112 |
| 2019/0210613 A1* | 7/2019 | Sun | ............... | G05D 1/0088 |
| 2019/0371179 A1* | 12/2019 | Christen | ............... | G06K 9/00771 |
| 2020/0039528 A1* | 2/2020 | Ewert | ............... | G01S 13/86 |
| 2020/0051434 A1* | 2/2020 | Sasaki | ............... | H04W 4/40 |
| 2020/0094848 A1* | 3/2020 | Hu | ............... | G07C 5/008 |
| 2020/0283028 A1* | 9/2020 | Oba | ............... | B60W 60/0057 |

FOREIGN PATENT DOCUMENTS

| | | | | | |
|---|---|---|---|---|---|
| CN | 105393083 | A | * | 3/2016 | ............. G01S 17/48 |
| CN | 105512628 | A | * | 4/2016 | ............... B60D 1/62 |
| CN | 105629236 | A | * | 6/2016 | ............. G01S 7/4817 |
| CN | 105634967 | A | * | 6/2016 | ............... B60D 1/62 |
| CN | 105699972 | A | * | 6/2016 | ........... G01S 7/4817 |
| CN | 107229279 | A | * | 10/2017 | ............... G05D 1/12 |
| CN | 107757479 | A | * | 3/2018 | ............. H04L 41/08 |
| CN | 107835753 | A | * | 3/2018 | ............... B60D 1/62 |
| CN | 108482032 | A | * | 9/2018 | ........... G01G 19/024 |
| CN | 108482366 | A | * | 9/2018 | ........... B62D 15/025 |
| CN | 109949570 | A | * | 6/2019 | ............. H04L 41/08 |
| CN | 110954910 | A | * | 4/2020 | ............. G05D 1/106 |
| EP | 3257729 | A1 | * | 12/2017 | ........... B62D 15/025 |
| JP | 4140889 | B2 | * | 8/2008 | ............. H02K 35/02 |
| JP | 2016142662 | A | * | 8/2016 | ............... B60D 1/62 |
| JP | 2019049952 | A | * | 3/2019 | ............... B60D 1/62 |
| KR | 20170056546 | A | * | 5/2017 | ............. G01S 17/89 |
| WO | WO-03098908 | A1 | * | 11/2003 | ............. H04L 41/08 |
| WO | WO-2008024368 | A2 | * | 2/2008 | ............. B82Y 10/00 |
| WO | WO-2016025908 | A2 | * | 2/2016 | ........... G01S 7/4817 |
| WO | 2017/053357 | A1 | | 3/2017 | |
| WO | WO-2018058442 | A1 | * | 4/2018 | ............. G05D 1/106 |

OTHER PUBLICATIONS

Pannu, et al., "Design and Implementation of Autonomous Car using Raspberry Pi," International Journal of Computer Applications (0975-8887), Mar. 2015, vol. 113, No. 9, pp. 22-29.

* cited by examiner

SYSTEM AND METHOD FOR EVALUATING OPERATION OF ENVIRONMENTAL SENSING SYSTEMS OF VEHICLES

TECHNICAL FIELD

The present disclosure relates generally to vehicles and more particularly to systems and methods for evaluating the operation of road-related environmental sensing systems of vehicles.

BACKGROUND

Many conventional vehicles are now equipped with a number of types of environmental sensors to evaluate the area around the vehicle. These include cameras for detecting the markings (e.g., lane and road boundary line markings), speed limit signs, potholes or other roadway damage; road surface sensors to detect current road conditions (e.g., wet surface, icy surface, clear/dry surface, etc.); proximity sensors to determine the location of other vehicles or other objects near the vehicle, etc. The ability of these environmental sensors to recognize nearby objects such as line markings, road signs, and obstacles on a roadway is critical for the operation of the vehicle, especially those that have driver-assist technology and those vehicles intended for autonomous driving.

While the proper operation of the environmental sensors is necessary for the safe operation of the vehicle, it can be difficult to determine when or if an environmental sensor is not operating properly. For instance, most drivers and passengers of these vehicles rarely conduct a maintenance check of these sensors to verify they are operating properly. In addition, determining proper operation of some environmental sensors may be difficult for everyday drivers to accomplish. This results from the fact that improper operation of the environmental sensors could result from failing to identify certain objects or road lines, or false positives, where items are detected that are not actually there. Either of these scenarios can cause issues with the safe operation of the vehicle.

BRIEF DESCRIPTION OF THE DRAWINGS

For a more complete understanding of the present disclosure and certain features thereof, reference is now made to the following description, in conjunction with the accompanying figures briefly described as follows.

DETAILED DESCRIPTION OF EXAMPLE EMBODIMENTS

Figure 1:
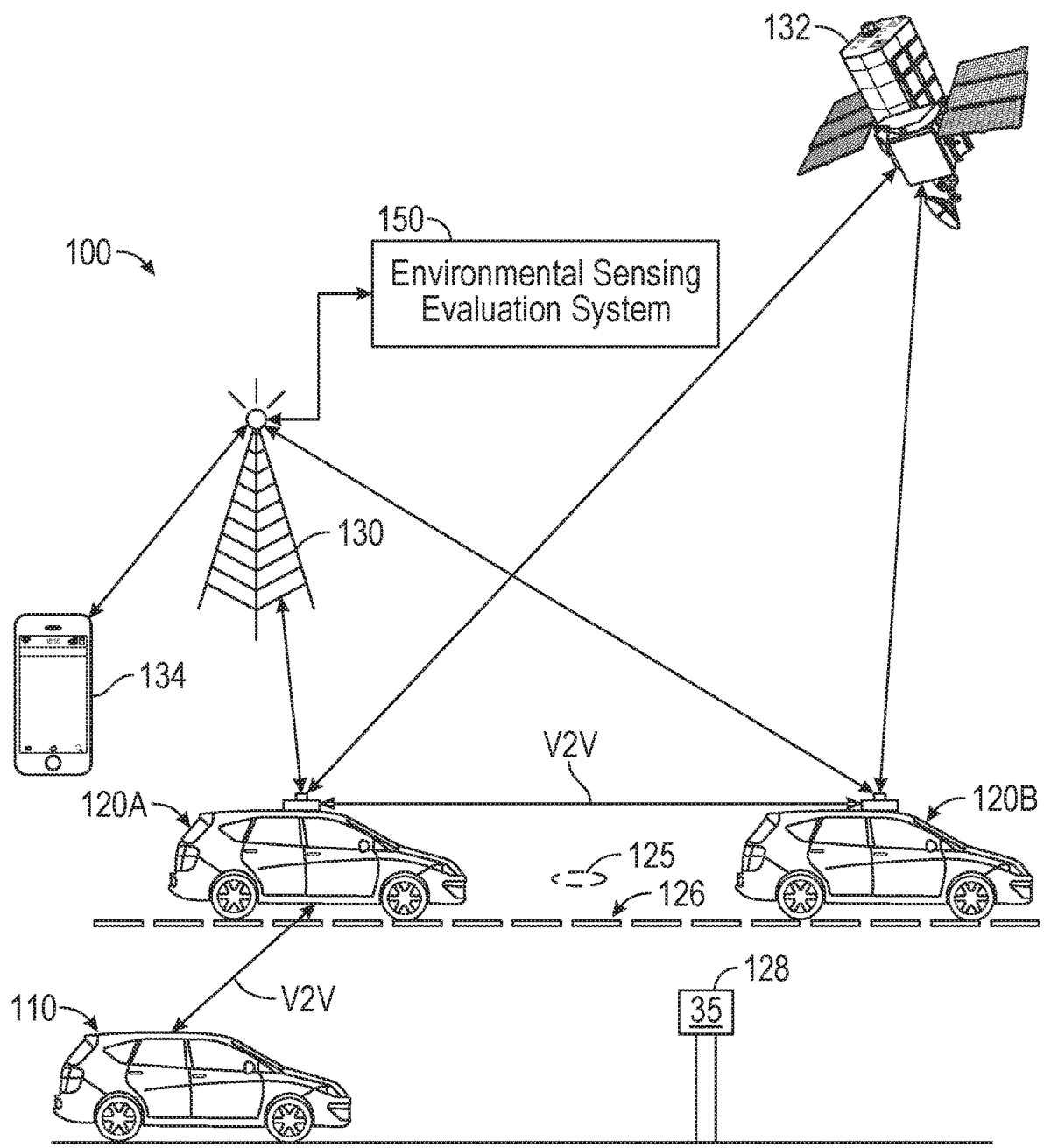
FIG. 1 shows an example operating environment for evaluating environmental sensing systems of vehicles, according to example embodiments of the disclosure.

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

According to examples of the present disclosure, an environmental sensing evaluation computer system can be in wireless communication with multiple vehicles. Each of the vehicles can be equipped with one or more sensors that make up that vehicle's environmental sensing system. When one or more of the environmental sensors on a vehicle detects an infrastructure issue (such as worn or missing lane line markings, worn or missing directional markings, potholes, speed limit signs with an undetectable speed, icy roads, wet roads, etc.) the vehicle's environmental sensing evaluation system can generate a report of the infrastructure issue. The report can include an identification of the infrastructure issue, the time/date the infrastructure issue was detected, and the location of the infrastructure issue (e.g., via Global Positioning System (GPS) coordinates. The report can be wirelessly transmitted (e.g., via cellular transmission, satellite transmission, or WIFI transmission) from the vehicle to the environmental sensing evaluation computer system.

In an example embodiment, the environmental sensing evaluation computer system is configured to evaluate the received environmental reports for object detection accuracy by the sensors of each vehicle. For example, the environmental sensing evaluation computer system can compare the infrastructure issue in the report from a first vehicle with similar, previously obtained environmental sensing reports from other vehicles. The environmental sensing evaluation computer can determine if other vehicles detected the same infrastructure issue detected by the first vehicle based on the comparison. If no other vehicles detected the infrastructure issue prior to the report by the first vehicle or the number reporting the infrastructure issue is not greater than a preset threshold value of reports of the infrastructure issue, the environmental sensing evaluation computer can generate a notification that one or more sensors of the first vehicle's environmental sensing system may not be working properly. As an example, the first vehicle may have sensor problems, making it difficult to recognize line markings that other vehicles are able to detect. The environmental sensing evaluation computer may then wirelessly transmit the notification to the first vehicle and/or to a mobile device associated with the owner of the first vehicle to inform them of the potential problem with one or more environmental sensors. In examples, where the notification is transmitted to the first vehicle, the notification may be displayed on the vehicle's display and/or audibly played to the passengers of the first vehicle through its audio system.

In certain examples, if no other vehicles have reported the infrastructure issue and/or the preset threshold number of reports have not been received, the environmental sensing evaluation computer may wait a predetermined additional amount of time after the report of the infrastructure issue by the first vehicle to see if the number of reports meets the threshold after the predetermined time has passed. This example may be useful when the first vehicle is the first or one of the first vehicles to identify an infrastructure issue that has recently occurred. Additionally, in an example embodiment, the evaluation of the vehicle's environmental sensing system can be presented with a degree of confidence, taking into consideration and weighing various factors, including, but not limited to, frequency of vehicles traversing the location, weather conditions, and time of day.

In addition, if infrastructure issue is determined by the environmental sensing evaluation computer and/or the vehicle computing system to be a hazardous condition that has not been previously reported or that has not been reported to vehicles in the area for a predetermined amount of time, a notification can be immediately broadcast wirelessly to all vehicles within a predetermined distance of the location of the hazardous condition or within broadcast range of a cell tower and/or the first vehicle by the environmental sensing evaluation computer and/or the vehicle computing system to notify other vehicles of the issue.

FIG. 1 is directed to an example operating environment 100 for evaluating environmental sensing systems of vehicles, according to one example embodiment of the disclosure. Referring to FIG. 1, the example operating environment 100 is just one of many possible environments where vehicles may be driven and the disclosure set forth herein should not be limited to the environment 100 shown. The example operating environment 100 can include vehicles 110, 120A, and 120B communicatively connected to one another and to an environmental sensing evaluation computer system 150. Each of the vehicles 110, 120A, 120B can be any form of vehicle, including, but not limited to, autonomous automobiles or automobiles with driver-assist technology that provide the driver of the vehicle with information regarding the environment around the vehicle and may also provide tactile feedback, warning lights and/or warning sounds when the vehicle is encountering or about to encounter a hazardous infrastructure issue in the environment outside of the vehicle. Further, each vehicle 110, 120A, 120B can be any type of engine-based, electric, or hybrid vehicle configured to drive on roadways, including cars, trucks, sport-utility vehicles, vans, motorcycles, box trucks, recreational vehicles, semi trucks, dump trucks, and the like.

Each of the vehicles 110, 120A, 120B may include communication devices or modules that permit the vehicle to conduct Vehicle-to-Infrastructure (V2X) communications. In one example, the V2X communications can include a wireless WLAN and/or a cellular network (utilizing the illustrated cell tower 130, for example). The V2X communications can allow the vehicle to have bi-directional wireless communication with the environmental sensing evaluation computer 150 and other infrastructure. For example, the vehicle 110, 120A, 120B can transmit communications to the environmental sensing evaluation computer 150 via the cell tower 130 and receive communications from the evaluation computer 150 via the cell tower 130. Similarly, the vehicle can send notifications to other vehicles via the WLAN or cellular network by passing those notifications through the one or more cell towers 130 in the environment 100. The cell tower 130 can be any conventional cell tower and can represent one or many cell towers in the environment 100.

In one example embodiment, using V2X communication protocols, each vehicle 110, 120A, 120B can send messages to a base station several times per second which can include information relating to vehicle speed, heading, GPS coordinates, braking, and acceleration, for example. As will be described in greater detail, when a vehicle having an environmental sensing system, such as the autonomous vehicle 120A, encounters an object, such as line markings 126, a pothole 125, a roadway sign (e.g., a speed-limit sign 128, directional signage, caution signage or the like), on or near the roadway, the environmental sensing system, using one or more sensors/cameras on the vehicle 120A, may have difficulty recognizing the object, and may determine that an infrastructure issue has been identified. For example, the camera(s) or other sensors of the vehicle 120A may have trouble detecting the lane line markings 126, the speed on the speed limit sign 128, directional markers on the roadway, a pothole 125 in the roadway, ice on the roadway, rain on the roadway, etc. and the environmental sensing system of the vehicle 120A may determine that an infrastructure issue has been identified. In this example, the environmental sensing system of the vehicle 120A would generate an environmental report including the infrastructure issue, the time/date of the detection of the infrastructure issue, and the location of the vehicle/infrastructure issue at the time of detection, and transmit that environmental report using the V2X communication protocols to the environmental sensing evaluation computer system 150 via the cellular network and the cell tower 130.

The example operating environment can also include one or more GPS satellites 132. Each GPS satellite can be a conventional positioning satellite in orbit around the Earth. Each of the vehicles 110, 120A, 120B can include a GPS module that is configured to wirelessly communicate with the GPS satellite 132 to determine the location of the vehicle at a particular time. This location information can take the form of coordinates and or may be overlaid onto street maps to show the position of the vehicle with respect to certain roadways in the environment 100.

The environmental sensing evaluation computer 150 can determine the accuracy of the reported infrastructure issue by comparing it to previous such reportings by other vehicles (such as the vehicle 120B) that have recently traversed the same location coordinates, based on location information from the GPS satellite 132. The environmental sensing evaluation computer 150 can then broadcast a notification to other vehicles (e.g., 110, 120B) using V2X communication via the cell tower 130 and identifying the infrastructure issue if the reporting is determined to be accurate. Alternatively, the environmental sensing evaluation computer 150 can transmit a notification to the vehicle 120A of potential sensor problems using V2X communication via the cell tower 130. In addition or in another example embodiment, the environment 100 can also include a user mobile device 134 (e.g., a smart phone, smart tablet, smart watch, etc.) communicatively coupled to the environmental sensing evaluation computer 150 via, for example, the cell tower 130. In this example, the environmental sensing evaluation computer 150 can also transmit the notification of potential sensor issues to the user mobile device 134 associated with the vehicle 120A. In one example, the owner of the vehicle 120A can associate his/her user mobile device 120A with the vehicle 120A to receive such notifications from the environmental sensing evaluation computer 150.

Each of the vehicles 110, 120A, 120B may also include communication devices or modules that permit the vehicle to conduct Vehicle-to-Vehicle (V2V) communications. V2V communications permit a vehicle, such as vehicle 120A to directly communicate with other vehicles, such as vehicles 110 and 120B, in the vicinity of the vehicle 120A. Information can be both transmitted to and received from other vehicles using dedicated short range communications DSRC protocol, BLUETOOTH, or another short-range communications protocol. In one example, each vehicle is able to wirelessly broadcast this information in an omnidirectional pattern as it proceeds along the roadway. Information can include identified infrastructure issues, vehicle location, vehicle speed, heading, rate of acceleration/deceleration, road conditions, etc. For example, if the vehicle 120A encounters a hazardous infrastructure issue, such as a pothole 125, ice on the roadway, rain/water on the roadway, missing or undetectable lane line markings 126, an obstructed roadway sign 128 or the like, nearby vehicles, such as vehicles 110 and 120B, can be immediately alerted via V2V communications. Although FIG. 1 shows only three vehicles 110, 120A, 120B, it is to be understood that the environmental sensing evaluation computer system 150 would be able to accommodate a much larger number of such vehicles in a larger environmental footprint. In other words, the systems and methods described herein are scalable to a large degree.

Figure 2:
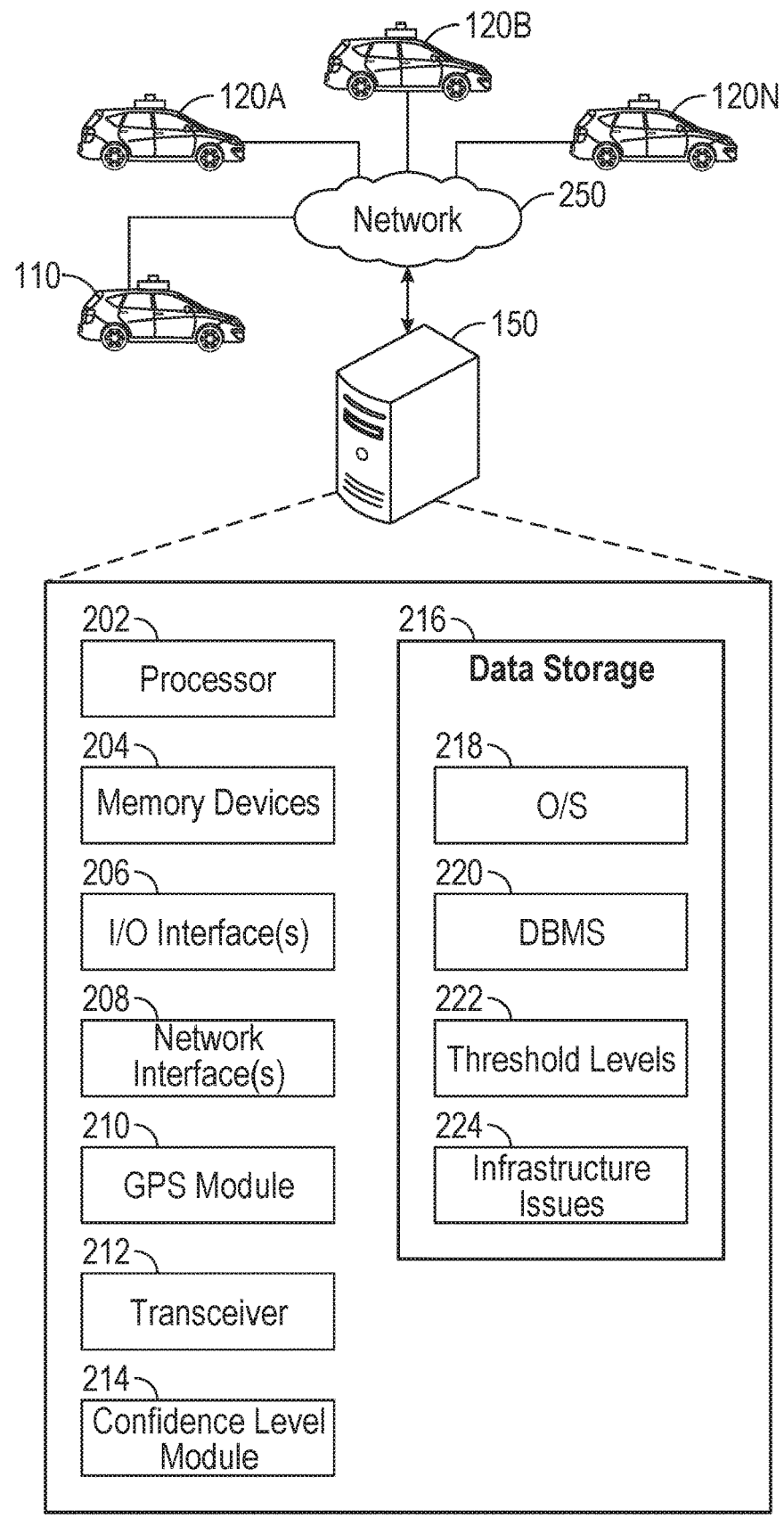
FIG. 2 is a schematic illustration of a vehicle environmental sensing evaluation system, according to example embodiments of the disclosure.

FIG. 2 is a schematic illustration of a vehicle environmental sensing evaluation system 150, according to example embodiments of the disclosure. Referring now to FIGS. 1 and 2, the example vehicle environmental sensing evaluation system 150, can include a processor 202, memory devices 204, I/O interface(s) 206, network interface(s) 208, a GPS module 210, a transceiver 212, a confidence module 214, and data storage 216. Data storage 216 includes storage to accommodate an operating system (O/S) 218, a database management system (DBMS) 220, and data representing various threshold levels 222 and infrastructure issues 224 received from vehicles 110, 120A-N.

The processor(s) 202 may include any type of suitable processing unit capable of accepting data as input, processing the input data in accordance with stored computer-executable instructions, and generating output data including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), a programmable logic processor (PLC), and so forth. Alternatively, the processor 202 can be another type of computing device or even a hardwired circuit. The processor(s) 202 may be configured to access the memory devices and/or the data storage 216 and execute the computer-executable instructions loaded therein. For example, the processor(s) 202 may be configured to execute the computer-executable instructions of the various program module(s), applications, engines, or the like of the vehicle environmental sensing evaluation system 150 to cause or facilitate various operations to be performed in accordance with one or more embodiments of the disclosure.

The memory device(s) 204 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The input/output (I/O) interface(s) 206 may facilitate the receipt of input information by the system 150 from one or more I/O devices as well as the output of information from the system 150 to the one or more I/O devices. The I/O devices may include any of a variety of components such as a keyboard, mouse, display or display screen having a touch surface or touchscreen; an audio output device for producing sound, such as a speaker; an audio capture device, such as a microphone; an image and/or video capture device, such as a camera; a haptic unit; and so forth. The I/O interface(s) 206 may also include a connection to one or more of the antenna(e) to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The system 150 may further include one or more network interface(s) 208 via which the system 150 may communicate with any of a variety of other systems, platforms, networks, devices (e.g., vehicles 110, 120A, 120B via V2X communication), and so forth. The network interface(s) 208 may enable communication, for example, with one or more wireless routers, one or more host servers, one or more web servers, and the like via one or more networks.

The system 150 may also include a GPS module 210 communicatively coupled to the processor(s) 202. The GPS module 210 can identify location coordinates received from vehicles as part of the reporting process and can help determine vehicles that are close to other vehicles. The system 150 can also include a transceiver 212 communicatively coupled to the processor(s) 202 and the interfaces 206, 208. The example transceiver 212 can include, without limitation, a cellular antenna for transmitting or receiving signals to/from a cellular network infrastructure (such as the cell tower(s) 130), an antenna for transmitting or receiving Wi-Fi signals to/from an access point (AP), a Global Positioning System (GPS) antenna for receiving GPS signals from a GPS satellite 132, and a Bluetooth antenna for transmitting or receiving Bluetooth signals. The system 150 can also include a confidence level module 214 communicatively coupled to the processor(s) 202 and the data storage 216. The confidence level module 214 can receive reports from vehicles 110, 120A, 120B, can identify the infrastructure issues within the reports, and can determine the likelihood that the identified infrastructure issue is an real issue or if there is a likelihood of a sensor malfunction or failure at the vehicle that sent the notification, based on other stored infrastructure issue reports 224 and certain threshold levels for a positive determination 222 stored in the data storage.

The data storage 216 may store one or more operating systems (O/S) 218; one or more database management systems (DBMS) 220; the threshold levels for a positive determination of an infrastructure issue 222, the identified infrastructure issues 224, and one or more program module(s), applications, engines, computer-executable code, scripts, or the like. Some or all of these component(s) may be sub-component(s).

The O/S 218 may be any currently existing or subsequently developed operating system and may be loaded from the data storage 216 into the memory device(s) 204 and may provide an interface between other application software executing on the system 150 and the hardware resources of the system 150. The DBMS 220 may be loaded into the memory device(s) 204 and may support functionality for accessing, retrieving, storing, and/or manipulating data stored in the memory devices 204 and/or data stored in the data storage 216. The DBMS 220 may use any of a variety of database models (e.g., relational model, object model, etc.) and may support any of a variety of query languages.

Any of the components depicted as being stored in the data storage 216 may include any combination of software, firmware, and/or hardware. The software and/or firmware may include computer-executable code, instructions, or the like that may be loaded into the memory device(s) 204 for execution by one or more of the processor(s) 202. Any of the components depicted as being stored in the data storage 216 may support functionality described in reference to corresponding components named earlier in this disclosure.

The data storage 216 may include removable storage and/or non-removable storage including, but not limited to, magnetic storage, optical disk storage, and/or tape storage. The data storage 216 may provide non-volatile storage of computer-executable instructions and other data. In certain example embodiments, the data storage 216 can include program code stored on a non-transitory computer-readable medium useable by the processor 202 to perform various method steps described herein.

In example embodiments, the vehicles 110, 120A, 120B, . . . 120N can be linked to a base station via a V2X communication protocol, and additional communication with the automobile environmental sensing evaluation system 150 can be made via a network 250 (e.g., the Internet or another suitable network. In one example, the network is a cellular network that allows for V2X communication by way of cellular communication between the vehicles 110, 120A-N and the vehicle environmental sensing evaluation system 150 through one or more cell towers 130.

Figure 3:
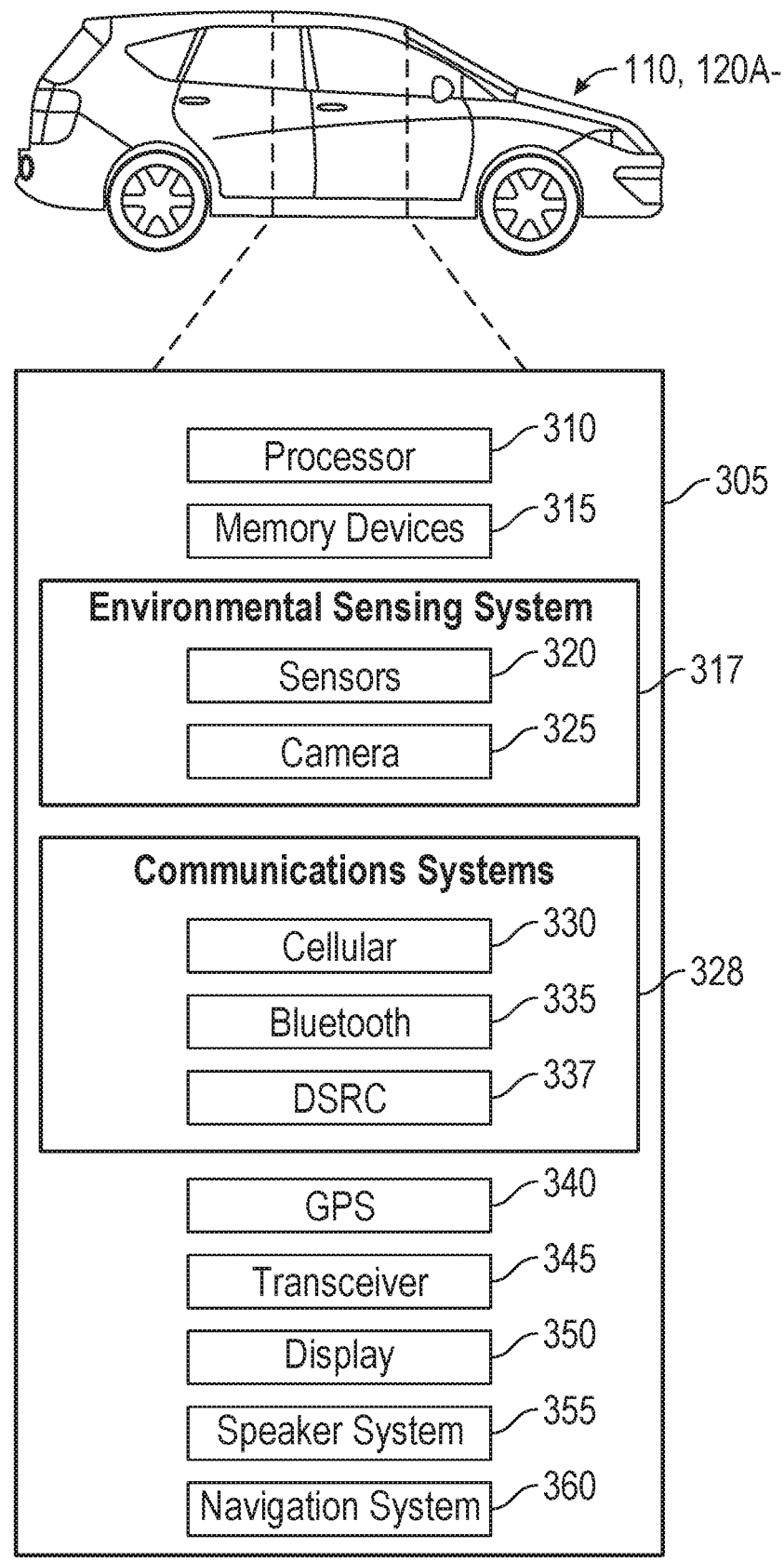
FIG. 3 is a schematic illustration of a vehicle computer system useable in conjunction with the vehicle environmental sensing evaluation system, according to example embodiments of the disclosure.

FIG. 3 is a schematic illustration of a vehicle computer system 305 for a vehicle 110, 120A-N, according to example embodiments of the disclosure. Referring now to FIGS. 1-33, the example vehicle computer system 305 may be useable in conjunction with the vehicle environmental sensing evaluation system 150. The vehicle computer system 305 can include one or more processors 310, one or more memory devices 315, an environmental sensing system 317, a communications interface system 328, a GPS module 340, a transceiver 345, a video display 350, a speaker system controller 355, and a navigation system 360.

The processor(s) 310 may include any type of suitable processing unit capable of accepting data as input, processing the input data in accordance with stored computer-executable instructions, and generating output data including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), a programmable logic processor (PLC), and so forth. Alternatively, the processor 310 can be another type of computing device or even a hardwired circuit. The processor(s) 310 may be configured to access the memory devices 315 and execute the computer-executable instructions loaded therein. For example, the processor(s) 315 may be configured to execute the computer-executable instructions of the various program module(s), applications, engines, or the like of the vehicle computer system 305 to cause or facilitate various operations to be performed in accordance with one or more embodiments of the disclosure.

The memory device(s) 315 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory. In example embodiments, the memory 315 can include program code stored on a non-transitory computer-readable medium useable by the processor 310 to perform various method steps described herein.

The environmental sensing system 317 can include one or more sensors 320 and one or more cameras communicatively coupled to the processor(s) 310. The one or more sensors 320 and one or more cameras 325 can provide information about the environment around the vehicle 110, 120A, or 120B in order to maintain the safe operation of the vehicle and to identify infrastructure issues. In one example, the one or more sensors 320 include, but are not limited to, proximity sensors, humidity sensors, optical sensors, traction control sensors, radar, and/or LIDAR, The communications system 328 can be communicatively coupled to the processor 310 and the transceiver 345 and can provide a number of communications protocols for the vehicle to communicate data from the vehicle computer system 305. Example communications protocols include cellular protocols 330 for communicating with the vehicle environmental sensing evaluation computer 150, via V2X communication for example, BLUETOOTH protocols for short range communication with the user mobile device 134 and other vehicles, and dedicated short range communications (DSRC) for communication with other vehicles, via V2V communication for example.

The GPS module 340 can be communicatively coupled to the processor(s) 310, the navigation system 360, and the transceiver 345. The GPS module 345 can be configured to communicate with the GPS satellite to provide real-time location of the vehicle. The location information can be included in reports provided to the vehicle environmental sensing evaluation system 150 to identify infrastructure issues. The location information can also be provided to the navigation system 360 for determining location of the vehicle and routes to reach desired destinations. The GPS module can also be configured to determine the location of other infrastructure issues broadcast (e.g., by V2X communication) by the environmental sensing evaluation system 150 or broadcast (e.g., by V2V communication) by other vehicles in the vicinity. The location information for the broadcast infrastructure issue can be communicated by the GPS module to the navigation system 360 and visually displayed on the display 350 of the vehicle.

The transceiver 345 can be communicatively coupled to the processor(s) 310, the GPS module 340, and the communications systems 328. The example transceiver 345 can include, without limitation, a cellular antenna for transmitting or receiving signals to/from a cellular network infrastructure (such as the cell tower(s) 130), an antenna for transmitting or receiving Wi-Fi signals to/from an access point (AP), a Global Positioning System (GPS) antenna for receiving GPS signals from a GPS satellite 132, and a Bluetooth antenna for transmitting or receiving Bluetooth signals (e.g., to or from the user mobile device 134).

The display 350 can be communicatively coupled to the processor(s) 310, the navigation system 360, camera(s) 325, and the environmental sensing system 317. The display 350 can be positioned along the dashboard or another part of the vehicle and can provide visual information about the vehicle. In certain examples, the display 350 can provide a visual indication of infrastructure issues identified by the vehicle. In addition, the display 350 can provide a visual indication of infrastructure issues broadcast by other vehicles and/or the vehicle environmental sensing evaluation system 150.

The speaker system can be communicatively coupled to the processor(s) 310, the navigation system 360, one or more sensor(s) 320, and the environmental sensing system 317. The speaker system 355 can be operably coupled to a number of speakers distributed throughout the vehicle and can provide audible information about the vehicle. In certain examples, the speaker system 355 can provide an audible indication of infrastructure issues identified by the vehicle. In addition, the speaker system 355 can provide an audible indication of infrastructure issues broadcast by other vehicles and/or the vehicle environmental sensing evaluation system 150.

The vehicle computer system 305 can be a standalone computer system or integrated into an existing vehicle computer system. The environmental sensors 320 and camera 325 can be used, along with necessary software (employing deep learning algorithms, for example) to detect objects as the vehicle is in operation, and are part of the environmental sensing system 317 as this term is used herein.

Figure 4:
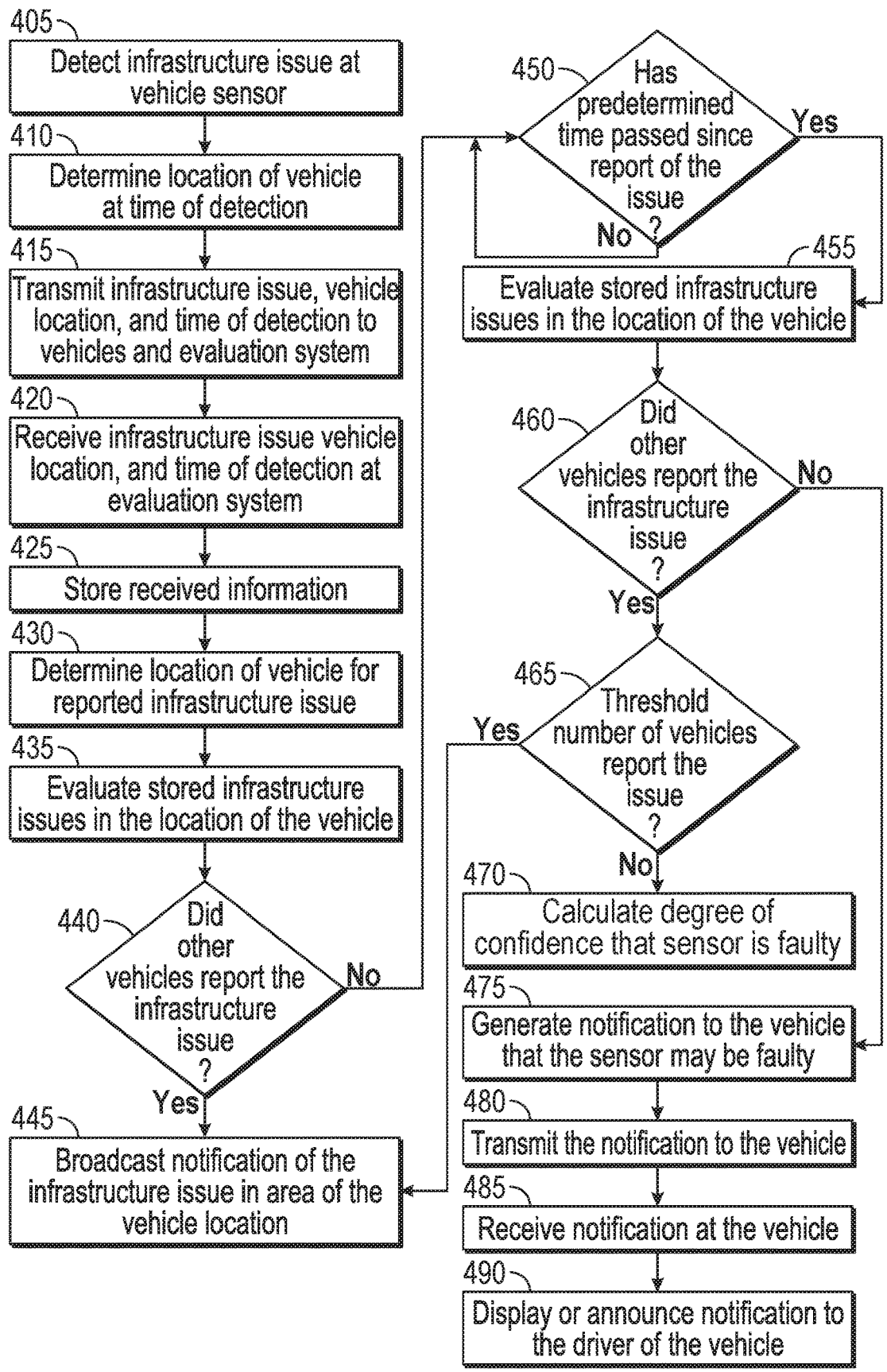
FIG. 4 is an example process flow for determining if a false positive detection has occurred with one or more of the vehicle environmental sensors, according to example embodiments of the disclosure.

FIG. 4 is an example process flow 400 for determining if a false positive detection has occurred with one or more of the vehicle environmental sensors (e.g., sensors 320, camera 325), according to example embodiments of the disclosure. In certain example embodiments, the process flow 400 can be accomplished by one or more of the environmental sensing evaluation computer 150 and one or more vehicle computer systems 305. Referring to FIGS. 1-4, the method 400 can begin in block 405 where the vehicle computer system 305 (employing the sensors 320 and camera 325) detects an infrastructure issue as the vehicle 120A is in operation. In certain example embodiments, the infrastructure issue can include, but is not limited to, worn or missing lane line markings, worn or missing directional markings, potholes, speed limit signs with an undetectable speed, road slope grade signs, icy roads, wet roads, etc.).

At block 410, the location of the vehicle 120A/infrastructure issue at the time of the detection is determined. In one example, the location of the vehicle 120A/infrastructure issue can be determined by the vehicle computer system 305 employing the GPS module 340 via the processor 310 to determine current location at the time the infrastructure issue is detected by the sensors 320 and/or camera 325 based on location data provided by the GPS satellite 132. The location information, time of detection of the infrastructure issue, an identification of the sensor(s) 320 and/or camera(s) 325 that detected the infrastructure issue, and the infrastructure issue data may then be linked by the processor 320 and stored in memory 315. At block 415, an identification of the vehicle 120A, the infrastructure issue, vehicle location (e.g., GPS coordinates), and time of detection of the infrastructure issue can be transmitted as a notification to the environmental sensing evaluation computer 150 and to other vehicles (e.g., vehicles 110 and 120B). In certain examples, the infrastructure issue, vehicle location, and time of detection can be transmitted from the vehicle 120A to the environmental sensing evaluation computer 150 via the DSRC module 337 and the transceiver 345 and can be broadcast to the other vehicles 110, 120B with the transceiver 345 using V2V communication. In certain examples, the notification can also include an indication or identification of the sensor(s) 320/camera(s) 325 that detected the infrastructure issue.

At block 420, the environmental sensing evaluation computer 150 receives the notification from the vehicle 120A including the infrastructure issue, vehicle location and time of detection. In one example, the notification is received by the processor 202 via the transceiver 212. It is to be understood that the communication of the forgoing information may be done using any suitable wireless technology, including a WLAN, WIFI, cellular network (in which case the cellular interface 330 would be used) or the like. At block 425, the processor 202 of the environmental sensing evaluation computer 150 can store the received notification of the infrastructure issue from the vehicle 120A (e.g., infrastructure issue, vehicle location and time of detection) in, for example, the infrastructure issues database 224 in data storage 216 (which can include a database or flat file, for example).

At block 430, the environmental sensing evaluation computer 150 can determine the location of the vehicle 120A/infrastructure issue when the infrastructure issue was detected. For example, the processor 202 can parse the notification of the infrastructure issue from the vehicle 120A and can identify the location information (e.g., GPS coordinates). The processor 202 can then employ the GPS module 210 to identify the location of the vehicle 120A/infrastructure issue at the time of detection of the infrastructure issue based on the location information. At block 435, the processor 202 can retrieve/access from the infrastructure issues database 224 in data storage 216 and evaluate any previously reported infrastructure issues at or within a predetermined distance of the location of the vehicle 120A/infrastructure issue at the time of detection. In one example embodiment, the predetermined distance can be a configurable value and can be based on the minor variations in location based detection technology. In certain examples, the predetermined distance can be less than 100 feet from the determined location of the vehicle 120A/infrastructure issue at the time of detection.

At block 440, an inquiry is conducted to determine if other vehicles reported the same infrastructure issue as reported by the vehicle 120A. In one example, the determination can be made by the processor 202 of the environmental sensing evaluation computer 150. For example, the processor 202 can based on the evaluation of the infrastructure issues database 224 of other notifications of infrastructure issues from other vehicles, determine if the same infrastructure issue was identified by another vehicle 110, 120B in the same or substantially the same location as that detected by vehicle 120A using a matching algorithm. In certain example embodiments, the evaluation of other notifications can be further restrained to a particular period of time prior to the notification from the vehicle 120A, such as, for example, within the last week, within the last month, within the last two months, etc.

If the processor 202 determines that other vehicles reported the same infrastructure issue for the same or substantially the same location, the environmental sensing system 317 (including the sensors 320 and/or the camera 325) of the vehicle 120A appears to be operating properly and the YES branch can be followed to block 445, where the processor 202 of the environmental sensing evaluation computer 150 can broadcast a notification of the infrastructure issue identified by the vehicle 120A to other vehicles 110, 120B within a predetermined vicinity of the of the location of the infrastructure issue using the transceiver 212 and one or more cell towers 130. The broadcast from the environmental sensing evaluation computer 150 can be received by the respective vehicle computer systems 305 of each vehicle 110, 120B and optionally also by one or more user mobile devices 134 of the occupants of the vehicles 110, 120B. In certain examples, the predetermined vicinity can be a configurable value and can be, for example, one mile, one-half mile, one-quarter mile, 500 feet, or any other distance in the range of zero feet to five miles. Such broadcast may alternatively, or additionally, be done to nearby vehicles using V2V communication.

Returning to block 440, if the processor 202 determines that other vehicles did not report the same infrastructure issue for the same or substantially the same location, then the NO branch can be followed to block 450, where a determination is made as to whether a predetermined length of time has passed since the notification of the infrastructure issue was received from the vehicle 120A. Because the detected infrastructure issue may be relatively recent, (e.g., the lane markings 126 just recently became obscured or the pothole 125 was just recently created, for example), other vehicles may not have yet encountered the infrastructure issue and thus, other notifications of the infrastructure issue have not yet been received yet by the environmental sensing evaluation computer 150. Accordingly, waiting a predetermined length of time allows for other vehicles to potentially report the same issue. In certain example embodiments, the predetermined length of time can be anywhere in the range of one minute to one month. If the processor 202 determines that the predetermined length of time has not passed, such as by taking the difference of the current time and the time of detection and comparing that to the predetermined length of time, the NO branch can be followed again to block 450 (looping until the predetermined length of time has passed).

If the processor 202 determines that the predetermined length of time has passed, processor can once again evaluate the notifications of infrastructure issues received to determine if other vehicles 110, 120B have detected the same infrastructure issue. As such, the YES branch can be followed to block 455 where the processor 202 can retrieve/access from the infrastructure issues database 224 in data storage 216 and evaluate any previously reported infrastructure issues at or within a predetermined distance of the location of the vehicle 120A/infrastructure issue at the time of detection.

At block 460, an inquiry is conducted to determine if other vehicles reported the same infrastructure issue as reported by the vehicle 120A. In one example, the determination can be made by the processor 202 of the environmental sensing evaluation computer 150. For example, the processor 202 can, based on the evaluation of the infrastructure issues database 224 of other notifications of infrastructure issues from other vehicles, determine if the same infrastructure issue was identified by another vehicle 110, 120B in the same or substantially the same location as that detected by vehicle 120A using a matching algorithm. In certain example embodiments, the evaluation of other notifications can be further restrained to a particular period of time prior to the notification from the vehicle 120A, such as, for example, within the last week, within the last month, within the last two months, etc.

If the processor 202 determines that other vehicles have not reported the same infrastructure issue for the same or substantially the same location, the NO branch can be followed to block 470. If the processor 202 determines that other vehicles reported the same infrastructure issue for the same or substantially the same location, the environmental sensing system 317 (including the sensors 320 and/or the camera 325) of the vehicle 120A may be operating properly or may have an issue similar to problems in other environmental sensing systems 317 of other vehicles 110, 120B. The YES branch can be followed to block 465, where an inquiry is conducted to determine if a threshold number of vehicles reported the same infrastructure issue in the same or substantially the same location as that in the notification from the vehicle 120A. In one example, the determination can be made by the processor 202 based on threshold levels stored in the threshold levels database 222 of data storage 216. For example, if the threshold number of vehicles to report the infrastructure issue is five and only three have reported after the predetermined time period has passed, then the threshold has not been met. The threshold number can be configurable and can vary significantly based on the traffic flow in the location. For example, more detections might be expected from a location where 500 cars pass in an hour as compared to one where 20 cars pass in an hour. Accordingly, the threshold number for the busier location can be significantly higher than the threshold number from the location with less traffic flow. In certain examples, the threshold number of vehicles reporting the same infrastructure issue in the same or substantially the same location can be anywhere in the range of 1-1000.

If the processor 202 determines that at least the threshold number of vehicles have also reported the infrastructure issue, the YES branch can be followed to block 445 where the environmental sensing system 317 (including the sensors 320 and/or the camera 325) of the vehicle 120A appears to be operating properly and the processor 202 can broadcast a notification of the infrastructure issue identified by the vehicle 120A to other vehicles 110, 120B within a predetermined vicinity of the of the location of the infrastructure issue using the transceiver 212 and one or more cell towers 130. The broadcast from the environmental sensing evaluation computer 150 can be received by the respective vehicle computer systems 305 of each vehicle 110, 120B and optionally also by one or more user mobile devices 134 of the occupants of the vehicles 110, 120B.

Returning to block 465, if the processor 202 determines that at least the threshold number of vehicles have not also reported the same infrastructure issue for the same or substantially the same location as in the notification from the vehicle 120A, then the NO branch can be followed to block 470, where the processor 202 can employ the confidence level module 214 to calculate a degree of confidence that the reporting vehicle 120A has faulty sensor(s) 320/camera(s) 325. The degree of confidence can be determined by the processor 202 and the confidence level module 214 using a probabilistic model taking into consideration various factors that could affect the determination such as, for example, a particular weather condition (e.g., snow, ice, rain, sleet, etc.), time of day (e.g., sunrise or sunset when glare on the roadway caused by the sun can affect sensor/camera operation), and traffic density. As an example, if it has started to snow, line markings 126 will become difficult to discern with the camera(s) 325 or sensor(s) 320, and as a result, the probabilistic model might return a relatively low confidence value (e.g., 20%) that the environmental sensing system 317, or a portion thereof, is faulty. On the other hand, if weather conditions are clear, there is a high traffic density near the reported location, and no other vehicles have reported the infrastructure issue, a high degree of confidence (e.g., 95%) that the environmental sensing system 317, or a portion thereof, is faulty might be reported. The probabilistic model can apply the same or different weighs to each of the factors. Additionally, the probabilistic model can include a Bayesian network or the like that takes into consideration probabilistic relationships between the factors.

At block 475, the processor 202 or the environmental sensing evaluation computer 150 can generate a notification to the vehicle 120A that all or a portion (e.g., the particular sensor(s) 320 or camera(s) 325 that identified the infrastructure issue at the vehicle 120A) of the environmental sensing system 317 may be faulty. The notification can include the infrastructure issue that was identified and the sensor(s) 320/camera(s) 325 that detected the infrastructure issue. The notification can also include the degree of confidence that the environmental sensing system 317, or a portion thereof, may be faulty. At block 480, the processor 202 can transmit the notification of a potential problem in the environmental sensing system 317 to the vehicle 120A. In one example, the notification can be transmitted by the processor 202 via the transceiver 212 to the vehicle 120A using a cellular network and the one or more cell towers 130. The notification can also or alternatively be transmitted via the cellular network and the one or more cell towers 130 to the user mobile device 134 associated with the owner or occupant of the vehicle 120A.

At block 485, the vehicle 120A can receive the notification of the potential problem in the environmental sensing system 317 from the environmental sensing evaluation computer 150. In one example, the notification is received by the transceiver 345 via the cellular module 330 and processed by the processor 310.

At block 490, the vehicle computer system 305 notifies the driver/occupant of the vehicle 120A of the information in the notification, including but not limited to, notification of a potentially faulty sensor(s) 320/camera(s) 325. Such notification can be provided using the display 350 to show a visual message inside the vehicle 120A and/or using speaker system 355 to provide an audible notification or alert inside of the vehicle 120A. Additionally, or alternatively, an appropriate "check engine" light or other warning light on the dashboard of the vehicle 120A can be displayed to the driver/occupant.

Figure 5:
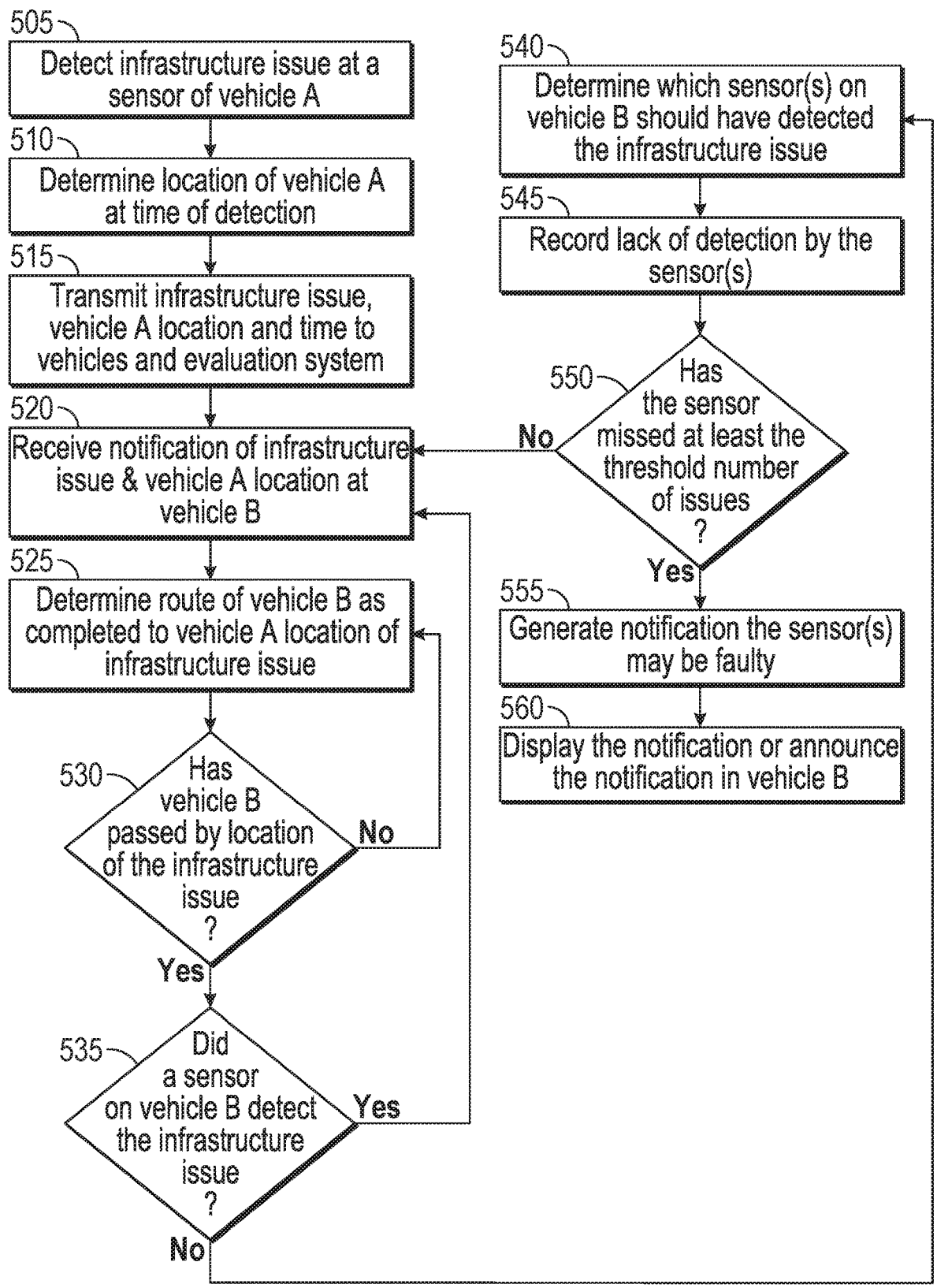
FIG. 5 is an example process flow for determining if one or more vehicle environmental sensors failed to detect an infrastructure issue, according to example embodiments of the disclosure.

FIG. 5 is an example process flow 500 for determining if one or more vehicle environmental sensors (e.g., sensors 320 and cameras 325) failed to detect an infrastructure issue where one existed, according to example embodiments of the disclosure. In certain example embodiments, the process flow 500 can be accomplished by one or more of the environmental sensing evaluation computer 150 and one or more vehicle computer systems 305. Referring to FIGS. 1-3 and 5, the method 500 can begin in block 505 where the vehicle computer system 305 of vehicle 120B (employing the sensor(s) 320 and/or camera(s) 325) detects an infrastructure issue as the vehicle 120B is in operation. In certain example embodiments, the infrastructure issue can include, but is not limited to, worn or missing lane line markings, worn or missing directional markings, potholes, speed limit signs with an undetectable speed, road slope grade signs, icy roads, wet roads, etc.).

At block 510, the location of the vehicle 120B/infrastructure issue at the time of the detection is determined. In one example, the location of the vehicle 120B/infrastructure can be determined by the vehicle computer system 305 of vehicle 120B employing the GPS module 340 via the processor 310 to determine current location at the time the infrastructure issue is detected by the sensor(s) 320 and/or camera(s) 325 based on location data provided by the GPS satellite 132. The location information, time of detection of the infrastructure issue, an identification of the sensor(s) 320 and/or camera(s) 325 that detected the infrastructure issue, and the infrastructure issue data may then be linked by the processor 320 and stored in memory 315 of vehicle 120B. At block 515, the identification of the vehicle 120A, the infrastructure issue, vehicle location (e.g., GPS coordinates), and time of detection of the infrastructure issue can be transmitted as a notification to the environmental sensing evaluation computer 150 and to other vehicles (e.g., vehicles 110 and 120A). In certain examples, the infrastructure issue, vehicle location, and time of detection can be transmitted from the vehicle 120B to the environmental sensing evaluation computer 150 via the DSRC module 337 and the transceiver 345 and can be broadcast to the other vehicles 110, 120A with the transceiver 345 using V2V communication. In certain examples, the notification can also include an indication or identification of the sensor(s) 320/camera(s) 325 that detected the infrastructure issue.

At block 520, the vehicle 120A can receive the notification of an infrastructure issue identified by vehicle 120B. In one example, vehicle 120A receives the notification of the infrastructure issue directly from vehicle 120B via V2V communication. In another example, the vehicle 120A receives the notification of the infrastructure issue from the environmental sensing evaluation computer 150 via one or more cell towers 130. In one example, the notification can be received by the processor 310 via the transceiver 345 using the cellular module 330 or the DSRC module 337 at the vehicle 120A.

At block 525, the processor 310 can determine the current and historical route of the vehicle 120A as compared to the location of the infrastructure issue identified by vehicle 120B. For example, the processor 310 can parse the notification and identify the location data (e.g., GPS coordinates) can employ the GPS module 340 to determine the location of the infrastructure issue. The processor 310 can also employ the navigation system 360 to determine the historical route of the vehicle 120A over a predetermined time and the current route of the vehicle 120A.

At block 530, an inquiry is conducted to determine if the vehicle 120A has passed by the location of the infrastructure issue identified by vehicle 120B within a predetermined amount of time. In one example, the determination can be made by the processor 310 of the vehicle computer system 305 for the vehicle 120A. The determination can be made based on a comparison of the historical route of the vehicle 120A as compared to the location of the infrastructure issue. The predetermined amount of time can be anywhere in the range of 1 second-1 month, in certain example embodiments, and can be configurable. If the processor 310 determines that the vehicle 120A has not passed by the location of the infrastructure issue, the NO branch can be followed back to block 525 where the process can loop until the vehicle 120A does pass the location. The looping can be limited to a particular number of cycles or a particular amount of time before the loop is abandoned, in certain embodiments. If the processor 310 determines that the vehicle 120A has passed by the location of the infrastructure issue, the YES branch can be followed to block 535.

At block 535, an inquiry is conducted to determine if one or more sensor(s) 320 and/or camera(s) 325 of vehicle 120A detected the infrastructure issue. In one example, the determination can be made by the processor 310 of the vehicle computer system 305 for the vehicle 120A. For example, the processor 310 can retrieve notifications of the infrastructure issues identified by the vehicle 120A from one or more of the memory devices 315 and can compare them to the notification of infrastructure issue identified by the vehicle 120B to determine if a match exists. For example, the processor 310 can use a matching algorithm to determine if the same infrastructure issue at the same or substantially the same location was identified by the vehicle 120A. If the processor 310 determines that the one or more sensor(s) 320 and/or camera(s) 325 detected the same infrastructure issue as in the notification, then the YES branch can be followed back to block 520 to await the receipt of the next notification of infrastructure issue detected by another vehicle. On the other hand, if the processor 310 determines that the one or more sensor(s) 320 and/or camera(s) 325 did not detect the same infrastructure issue as in the notification, then the NO branch can be followed to block 540.

At block 540, the processor 310 can determine which sensor(s) 320 and/or camera(s) 325 on the vehicle 120A should have detected the infrastructure issue. For example, the particular type of infrastructure issue that was identified by the vehicle 120B and the location of the infrastructure issue (including which side of the vehicle 120A it may be on) may require a particular sensor 320 or camera 325 for detection based on the features and or location of that particular sensor 320 or camera 325. In one example, a relational table of types and locations of infrastructure issues to sensor(s) 320 and/or camera(s) 325 that should detect it can be stored in the one or more memory devices 315 and may be evaluated by the processor 310 to determine which sensor(s) 320 and/or camera(s) 325 should have detected the infrastructure issue that was detected by vehicle 120B.

The processor 310 can store the identification of the sensor(s) and/or camera(s) that should have detected the infrastructure issue in one or more of the memory devices 315 at block 545. At block 550, an inquiry is conducted to determine if the sensor(s) 320 and/or camera(s) 325 of the vehicle 120A has missed at least a threshold number of infrastructure issues that were identified by other vehicles (e.g., 110, 120B). In one example, the determination can be made by the processor 310 of the vehicle 120A. For example, each time a particular sensor 320 or camera 325 is determined to have missed an infrastructure issue, as set forth in blocks 535-545 and are stored in the one or more memory devices 315, a counter variable associated with each particular sensor 320 and/or camera(s) 325 can be incremented by 1. The processor 310 can compare the current counter variable for the particular sensor(s) 320 and/or camera(s) identified in block 540 to a threshold value stored in memory 315 that represents, for example, the number of misses that reasonably verifies that there is a sensor/camera problem with the environmental sensing system 317 of the vehicle 120A. In certain examples, the threshold value can be the same for each sensor 320 and camera 325. In other examples, the threshold value can be different for one or more sensor(s) 320 and/or camera(s) 325.

If none of the sensor(s) 320 and/or camera(s) 325 of the vehicle 120A has missed at least a threshold number of infrastructure issues that were identified by other vehicles (e.g., 110, 120B), then the NO branch can be followed to block 520 to await receipt of the next infrastructure issue notification from another vehicle 110, 120B or from the environmental sensing evaluation computer 150. If one or more of the sensor(s) 320 and/or camera(s) 325 of the vehicle 120A has missed at least a threshold number of infrastructure issues that were identified by other vehicles (e.g., 110, 120B), then the YES branch can be followed to block 555, where the processor can generate a notification that the particular sensor(s) 320 and/or camera(s) 325 may be faulty.

At block 560, the vehicle computer system 305 of the vehicle 120A notifies the driver/occupant of the vehicle 120A of the information in the notification, including but not limited to, notification of a potentially faulty sensor(s) 320/camera(s) 325 and the type of infrastructure issue missed. Such notification can be provided using the display 350 to show a visual message inside the vehicle 120A and/or using speaker system 355 to provide an audible notification or alert inside of the vehicle 120A. Additionally, or alternatively, an appropriate "check sensor" light or other warning light on the dashboard of the vehicle 120A can be displayed to the driver/occupant. In certain examples, the notification can also be transmitted by the processor 310 via the transceiver 345 to the user mobile device 134 of the owner/occupant of the vehicle 120A using the Bluetooth module 335, WIFI, near-field communication, or another form of short-range communication.

EXAMPLE EMBODIMENTS

In some instances, the following examples may be implemented together or separately by the systems and methods described herein.

Example 1 may include a system for evaluating environmental sensing systems of vehicles, comprising: at least one memory comprising computer-executable instructions; and at least one processor configured to access the at least one memory and execute the computer-executable instructions to: receive, from a first vehicle on a roadway, an infrastructure issue notification of an infrastructure issue on the roadway, wherein the infrastructure issue is detected by at least one sensor or camera on the first vehicle; determine a location of the infrastructure issue; determine if other vehicles reported the infrastructure issue at the location; generate, based at least on a determination that other vehicles have not reported the infrastructure issue at the location, a second notification indicating an issue with the at least one sensor or camera on the first vehicle; and direct communication of the second notification to the first vehicle.

Example 2 may include the system of example 1, wherein the at least one processor is further configured to access the at least one memory and execute the computer-executable instructions to: generate, based at least on a determination that other vehicles reported the infrastructure issue at the location, a third notification indicating the infrastructure issue at the location; and broadcast the third notification to at least one other vehicle within a predetermined distance of the location.

Example 3 may include the system of example 1 and/or some other example herein, wherein the at least one processor is further configured to access the at least one memory and execute the computer-executable instructions to: determine if a predetermined time has passed since the infrastructure issue was detected at the first vehicle; conduct a second determination if other vehicles reported the infrastructure issue at the location; and determine, based on a positive determination that other vehicles reported the infrastructure issues, a number of reports of the infrastructure issue; and compare the number of reports of the infrastructure issue to a threshold number of notifications.

Example 4 may include the system of example 3 and/or some other example herein, wherein the second notification is generated, based at least on the number of reports of the infrastructure issue being less than the threshold number of notifications.

Example 5 may include the system of example 3 and/or some other example herein, wherein the at least one processor is further configured to access the at least one memory and execute the computer-executable instructions to: generate, based at least on the number of reports of the infrastructure issue being less than the threshold number of notifications, a third notification indicating the infrastructure issue at the location; and broadcast the third notification to at least one other vehicle within a predetermined distance of the location.

Example 6 may include the system of example 1 and/or some other example herein, wherein the infrastructure issue notification comprises: the infrastructure issue; the location of the infrastructure issue; and a time of detection of the infrastructure issue.

Example 7 may include the system of example 6 and/or some other example herein, wherein the infrastructure issue notification further comprises: an identifier of the first vehicle; and an identification of the at least one sensor or camera that detected the infrastructure issue.

Example 8 may include the system of example 1 and/or some other example herein, wherein the infrastructure issue is one of: a worn lane line marking, a missing lane line marking, a worn directional marking; a missing directional marking, a pothole, a speed limit sign with an undetectable speed indication, a road slope grade sign, an icy roadway surface, or a wet roadway surface.

Example 9 may include a computer-implemented method for evaluating environmental sensing systems of vehicles, comprising: receiving, by a processor of an evaluation computer from a first vehicle on a roadway, an infrastructure issue notification of an infrastructure issue on the roadway, wherein the infrastructure issue is detected by at least one sensor or camera on the first vehicle; determining, by the processor, a location of the infrastructure issue; determining, by the processor, if other vehicles reported the infrastructure issue at the location; generating, by the processor and based at least on a determination that other vehicles have not reported the infrastructure issue at the location, a second notification indicating an issue with the at least one sensor or camera on the first vehicle; and transmitting, by the processor, the second notification to the first vehicle.

Example 10 may include the computer-implemented method of example 9, further comprising generating, by the processor and based at least on a determination that other vehicles reported the infrastructure issue at the location, a third notification indicating the infrastructure issue at the location; and broadcasting, by the processor, the third notification to at least one other vehicle within a predetermined distance of the location.

Example 11 may include the computer-implemented method of example 9 and/or some other example herein, further comprising: determining, by the processor, if a predetermined time has passed since the infrastructure issue was detected at the first vehicle; conducting, by the processor, a second determination if other vehicles reported the infrastructure issue at the location; and determining, by the processor and based on a positive determination that other vehicles reported the infrastructure issues, a number of reports of the infrastructure issue; and comparing, by the processor, the number of reports of the infrastructure issue to a threshold number of notifications.

Example 12 may include the computer-implemented method of example 11 and/or some other example herein, wherein the second notification is generated, based at least on the number of reports of the infrastructure issue being less than the threshold number of notifications.

Example 13 may include the computer-implemented method of example 11 and/or some other example herein, further comprising generating, by the processor and based at least on the number of reports of the infrastructure issue being less than the threshold number of notifications, a third notification indicating the infrastructure issue at the location; and broadcasting, by the processor, the third notification to at least one other vehicle within a predetermined distance of the location.

Example 14 may include the computer-implemented method of example 9 and/or some other example herein, wherein the infrastructure issue notification comprises: the infrastructure issue; the location of the infrastructure issue; and a time of detection of the infrastructure issue.

Example 15 may include the computer-implemented method of example 14 and/or some other example herein, wherein the infrastructure issue notification further comprises: an identifier of the first vehicle; and an identification of the at least one sensor or camera that detected the infrastructure issue.

Example 16 may include the computer-implemented method of example 9 and/or some other example herein, wherein the infrastructure issue is one of: a worn lane line marking, a missing lane line marking, a worn directional marking; a missing directional marking, a pothole, a speed limit sign with an undetectable speed indication, a road slope grade sign, an icy roadway surface, or a wet roadway surface.

Example 17 may include a system for evaluating environmental sensing systems of vehicles, comprising: at least one memory comprising computer-executable instructions; and at least one processor configured to access the at least one memory and execute the computer-executable instructions to: receive, at a second vehicle, an infrastructure issue notification of an infrastructure issue on a roadway, wherein the infrastructure issue is detected by a first vehicle; determine a location of the infrastructure issue from the infrastructure issue notification; determine if the second vehicle has passed by the location of the infrastructure issue on the roadway; determine, based on a positive determination that the second vehicle has passed by the location of the infrastructure issue on the roadway, if at least one sensor or camera of the second vehicle detected the infrastructure issue; and store, based on the determination that the at least one sensor or camera of the second vehicle did not detect the infrastructure issue, a failure to detect record.

Example 18 may include the system of example 17, wherein the at least one processor is further configured to access the at least one memory and execute the computer-executable instructions to: determine which of the at least one sensor or camera should have detected the infrastructure issue, wherein the failure to detect record comprises an indication of the at least one sensor or camera that should have detected the infrastructure issue.

Example 19 may include the system of example 18 and/or some other example herein, wherein the at least one processor is further configured to access the at least one memory and execute the computer-executable instructions to: determine, for the at least one sensor or camera, a number of times the at least one sensor or camera has failed to detected an identified infrastructure issue; compare the number of times the at least one sensor or camera has failed to detected an identified infrastructure issue to a threshold failure value; and generate, based on a positive determination that number of times the at least one sensor or camera has failed to detected an identified infrastructure issue satisfies the threshold failure value, a fault notification for the at least one sensor or camera.

Example 20 may include the system of example 17 and/or some other example herein, wherein the infrastructure issue is one of: a worn lane line marking, a missing lane line marking, a worn directional marking; a missing directional marking, a pothole, a speed limit sign with an undetectable speed indication, a road slope grade sign, an icy roadway surface, or a wet roadway surface.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for evaluating environmental sensing systems of vehicles, comprising:
    at least one memory comprising computer-executable instructions; and
    at least one processor configured to access the at least one memory and execute the computer-executable instructions to:
    receive, from a first vehicle on a roadway, an infrastructure issue notification of an infrastructure issue on the roadway, wherein the infrastructure issue is detected by at least one sensor or camera on the first vehicle;
    determine a location of the infrastructure issue;
    determine if other vehicles reported the infrastructure issue at the location;
    generate, based at least on a determination that other vehicles have not reported the infrastructure issue at the location, a second notification indicating an issue with the at least one sensor or camera on the first vehicle; and
    direct communication of the second notification to the first vehicle.

2. The system of claim 1, wherein the at least one processor is further configured to access the at least one memory and execute the computer-executable instructions to:
    generate, based at least on a determination that other vehicles reported the infrastructure issue at the location, a third notification indicating the infrastructure issue at the location; and
    broadcast the third notification to at least one other vehicle within a predetermined distance of the location.

3. The system of claim 1, wherein the at least one processor is further configured to access the at least one memory and execute the computer-executable instructions to:
    determine if a predetermined time has passed since the infrastructure issue was detected at the first vehicle;
    conduct a second determination if other vehicles reported the infrastructure issue at the location; and
    determine, based on a positive determination that other vehicles reported the infrastructure issues, a number of reports of the infrastructure issue; and
    compare the number of reports of the infrastructure issue to a threshold number of notifications.

4. The system of claim 3, wherein the second notification is generated, based at least on the number of reports of the infrastructure issue being less than the threshold number of notifications and also based on a degree of confidence that a sensor of the vehicle is faulty.

5. The system of claim 3, wherein the at least one processor is further configured to access the at least one memory and execute the computer-executable instructions to:
    generate, based at least on the number of reports of the infrastructure issue being less than the threshold number of notifications, a third notification indicating the infrastructure issue at the location; and
    broadcast the third notification to at least one other vehicle within a predetermined distance of the location.

6. The system of claim 1, wherein the infrastructure issue notification comprises:
    the infrastructure issue;
    the location of the infrastructure issue; and
    a time of detection of the infrastructure issue.

7. The system of claim 6, wherein the infrastructure issue notification further comprises:
    an identifier of the first vehicle; and
    an identification of the at least one sensor or camera that detected the infrastructure issue.

8. The system of claim 1, wherein the infrastructure issue is one of: a worn lane line marking, a missing lane line marking, a worn directional marking; a missing directional marking, a pothole, a speed limit sign with an undetectable speed indication, a road slope grade sign, an icy roadway surface, or a wet roadway surface.

9. A computer-implemented method for evaluating environmental sensing systems of vehicles, comprising:
    receiving, by a processor of an evaluation computer from a first vehicle on a roadway, an infrastructure issue notification of an infrastructure issue on the roadway, wherein the infrastructure issue is detected by at least one sensor or camera on the first vehicle;
    determining, by the processor, a location of the infrastructure issue;
    determining, by the processor, if other vehicles reported the infrastructure issue at the location;
    generating, by the processor and based at least on a determination that other vehicles have not reported the infrastructure issue at the location, a second notification indicating an issue with the at least one sensor or camera on the first vehicle; and
    transmitting, by the processor, the second notification to the first vehicle.

10. The computer-implemented method of claim 9, further comprising
    generating, by the processor and based at least on a determination that other vehicles reported the infrastructure issue at the location, a third notification indicating the infrastructure issue at the location; and broadcasting, by the processor, the third notification to at least one other vehicle within a predetermined distance of the location.

11. The computer-implemented method of claim 9, further comprising:

determining, by the processor, if a predetermined time has passed since the infrastructure issue was detected at the first vehicle;

conducting, by the processor, a second determination if other vehicles reported the infrastructure issue at the location; and determining, by the processor and based on a positive determination that other vehicles reported the infrastructure issues, a number of reports of the infrastructure issue; and comparing, by the processor, the number of reports of the infrastructure issue to a threshold number of notifications.

12. The computer-implemented method of claim 11, wherein the second notification is generated, based at least on the number of reports of the infrastructure issue being less than the threshold number of notifications and also based on a degree of confidence that a sensor of the vehicle is faulty.

13. The computer-implemented method of claim 11, further comprising generating, by the processor and based at least on the number of reports of the infrastructure issue being less than the threshold number of notifications, a third notification indicating the infrastructure issue at the location; and broadcasting, by the processor, the third notification to at least one other vehicle within a predetermined distance of the location.

14. The computer-implemented method of claim 9, wherein the infrastructure issue notification comprises:

the infrastructure issue;

the location of the infrastructure issue; and a time of detection of the infrastructure issue.

15. The computer-implemented method of claim 14, wherein the infrastructure issue notification further comprises:

an identifier of the first vehicle; and an identification of the at least one sensor or camera that detected the infrastructure issue.

16. The computer-implemented method of claim 9, wherein the infrastructure issue is one of: a worn lane line marking, a missing lane line marking, a worn directional marking; a missing directional marking, a pothole, a speed limit sign with an undetectable speed indication, a road slope grade sign, an icy roadway surface, or a wet roadway surface.

17. A system for evaluating environmental sensing systems of vehicles, comprising:

at least one memory comprising computer-executable instructions; and at least one processor configured to access the at least one memory and execute the computer-executable instructions to:

receive, at a second vehicle, an infrastructure issue notification of an infrastructure issue on a roadway, wherein the infrastructure issue is detected by a first vehicle;

determine a location of the infrastructure issue from the infrastructure issue notification;

determine if the second vehicle has passed by the location of the infrastructure issue on the roadway;

determine, based on a positive determination that the second vehicle has passed by the location of the infrastructure issue on the roadway, if at least one sensor or camera of the second vehicle detected the infrastructure issue; and store, based on the determination that the at least one sensor or camera of the second vehicle did not detect the infrastructure issue, a failure to detect record.

18. The system of claim 17, wherein the at least one processor is further configured to access the at least one memory and execute the computer-executable instructions to:

determine which of the at least one sensor or camera should have detected the infrastructure issue, wherein the failure to detect record comprises an indication of the at least one sensor or camera that should have detected the infrastructure issue.

19. The system of claim 18, wherein the at least one processor is further configured to access the at least one memory and execute the computer-executable instructions to:

determine, for the at least one sensor or camera, a number of times the at least one sensor or camera has failed to detected an identified infrastructure issue;

compare the number of times the at least one sensor or camera has failed to detected an identified infrastructure issue to a threshold failure value; and generate, based on a positive determination that number of times the at least one sensor or camera has failed to detected an identified infrastructure issue satisfies the threshold failure value, a fault notification for the at least one sensor or camera.

20. The system of claim 17, wherein the infrastructure issue is one of: a worn lane line marking, a missing lane line marking, a worn directional marking; a missing directional marking, a pothole, a speed limit sign with an undetectable speed indication, a road slope grade sign, an icy roadway surface, or a wet roadway surface.

* * * * *